G. T. COOLEY.
Corn Planter.

No. 87,028.

Patented Feb. 16, 1869.

Witnesses

Inventor

United States Patent Office.

GILBERT T. COOLEY, OF WOOSTER, OHIO.

Letters Patent No. 87,028, dated February 16, 1869.

IMPROVEMENT IN CORN-PLANTERS.

The Schedule referred to in these Letters Patent and making part of the same.

*To all whom it may concern:*

Be it known that I, GILBERT T. COOLEY, of Wooster, in the county of Wayne, and State of Ohio, have invented certain new and useful Improvements in Corn-Planters; and I do hereby declare that the following is a full, clear, and exact description thereof, reference being had to the accompanying drawings, and to the letters of reference marked thereon, which form a part of this specification, and in which—

Figure 1:
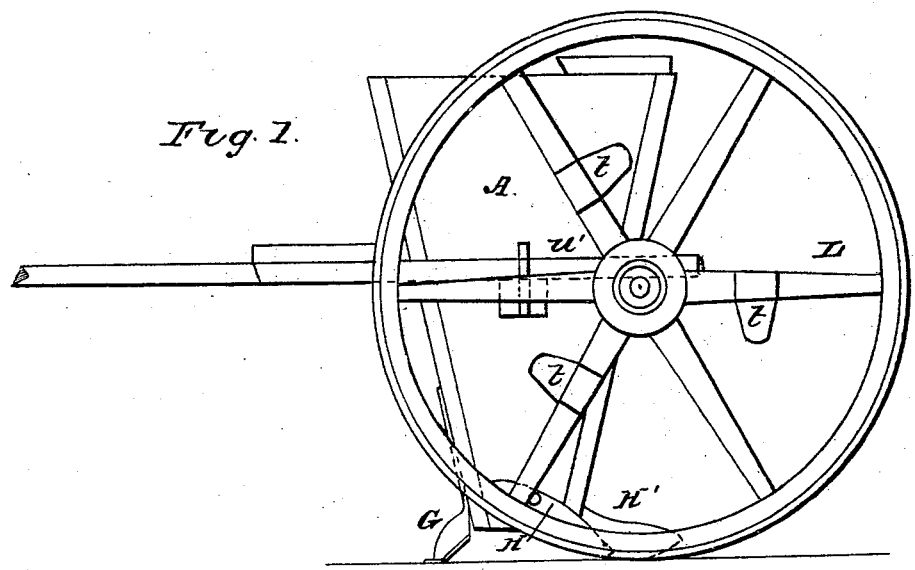

Figure 1 represents a side elevation, and

Figure 2:
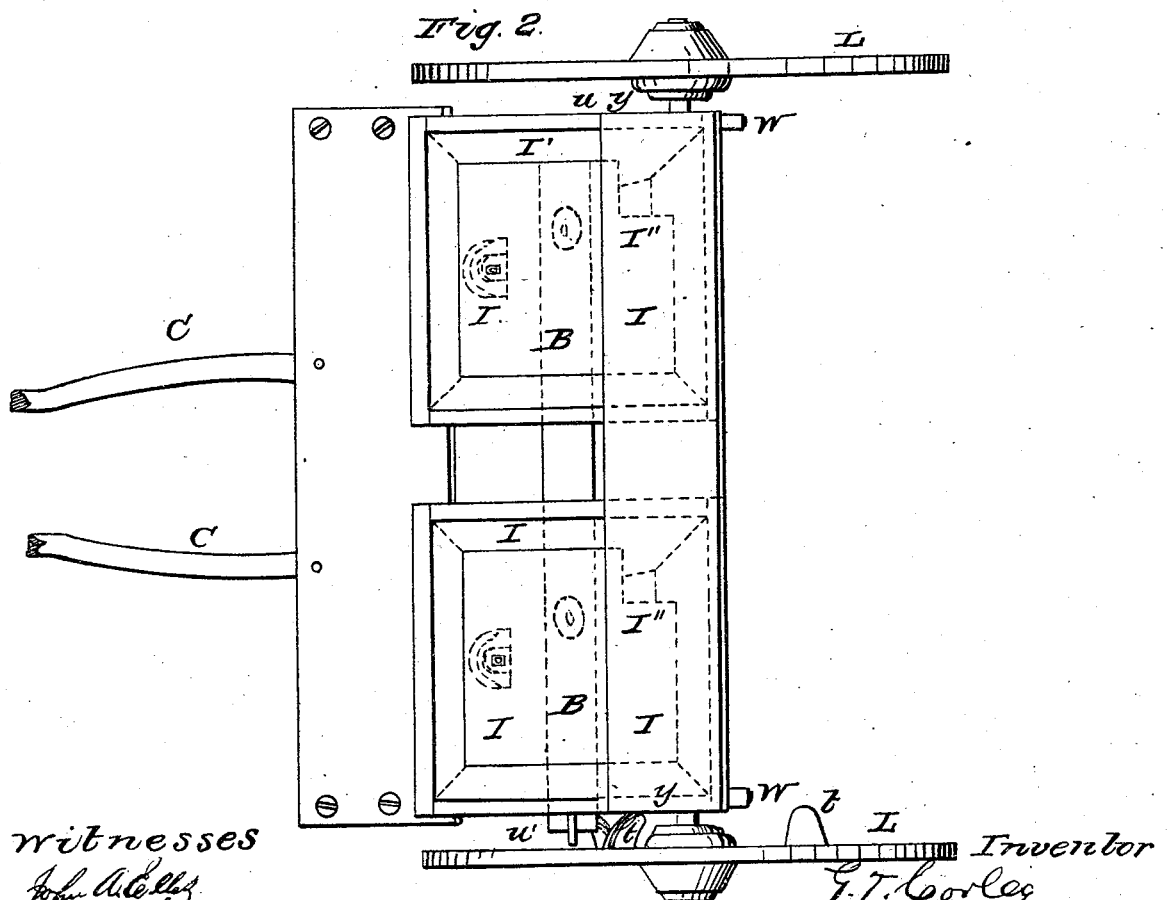

Figure 2, a plan view of my corn-planter.

The nature of my invention consists in the employment of two hoppers, supported on an ordinary two-wheel vehicle, said hoppers having false bottoms, as hereinafter more fully described.

It further consists in providing the lower end of each hopper with shovel-plows, with two bent covers or bars attached to the lower rear end of said hoppers.

To enable others skilled in the art to which my invention appertains, to make and use the same, I will describe its construction and operation.

In the accompanying drawing—

A A represent two hoppers, which are made as seen in fig. 1, and secured to the axle-tree Y, by the bars W W.

The hoppers are provided with the angular bottoms I I, which fit close against the distributer-bar B.

Over these angular bottoms are placed the upper bottoms I' I', which are constructed with one end cut out, I".

Through these hoppers is passed the distributer-bar B, which is made with a hole near each end, which works over a corresponding hole made in the bottom of the hoppers.

*u* is a spring, one end of which is attached to the hopper, and the other end bearing against the end of the distributer-bar B.

The other end of the bar B is provided with a similar spring, *u'*.

On the wheel L are secured the projections *t t t*, so that when the planter is in operation, the projections on the wheel strike the spring *u'*, which forces the bar B in, and cause the holes made therein to pass over the corresponding holes in the bottom of the hopper, thereby causing a flow of grain.

G is a shovel-plow, attached to the front lower end of the hoppers, for the purpose of making the furrow.

H H' are covers or bent bars, made as seen in fig. 1, for the purpose of covering up the furrow after the grain has been dropped.

C C are shafts, secured to the hoppers.

The seed is placed in the hoppers, upon false bottoms I' I', to prevent unnecessary friction or crowding of the seed on the distributer-bar.

The holes in the bar B are made sufficiently deep to contain the desired quantity of seed, and then extending horizontally and out below.

This machine is intended to plant and cover two rows at the same time.

Having thus fully described my invention,

What I claim as new, and desire to secure by Letters Patent, is—

The arrangement of the plows G G, coverers H H', hoppers A A, false or upper bottoms I I', distributing-bar B, springs *u u'*, and projections *t t*, constructed and operated as described.

In testimony that I claim the foregoing as my own, I affix my signature, in presence of two witnesses.

GILBERT T. COOLEY.

Witnesses:
HENRY LEHMAN,
LUCIAN ADAMS.